F. LÜTHKE.
MOTOR.VEHICLE AND TRUCK.
APPLICATION FILED DEC. 11, 1908.
927,256.
Patented July 6, 1909.
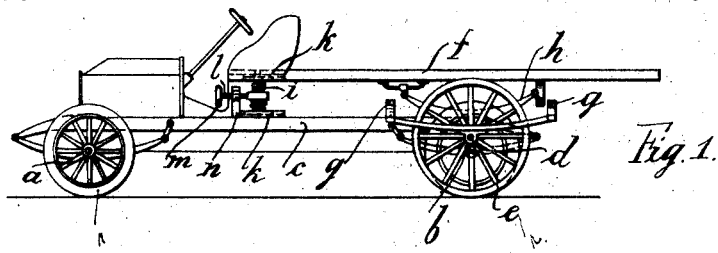
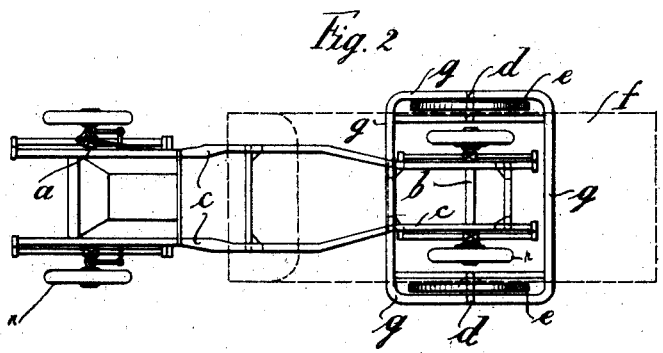
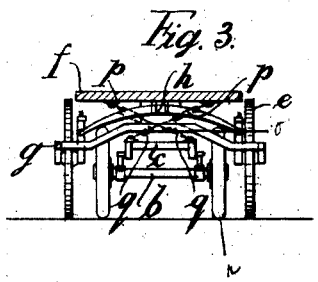

UNITED STATES PATENT OFFICE.

FRIEDRICH LÜTHKE, OF BREMEN, GERMANY.

MOTOR VEHICLE AND TRUCK.

No. 927,256.           Specification of Letters Patent.          Patented July 6, 1909.

Application filed December 11, 1908. Serial No. 467,006.

*To all whom it may concern:*

Be it known that I, FRIEDRICH LÜTHKE, builder, citizen of the free town of Bremen, residing at Utbremerstrasse 156, Bremen, Germany, have invented certain new and useful Improvements in Motor Vehicles and Trucks, of which the following is a specification, reference being had therein to the accompanying drawing.

This invention consists in a new type of motor vehicle adapted to lessen the great wear in tire material to which the back wheels of such vehicles, which ordinarily bear the greater part of the load, are exposed, and while particularly adapted to vehicles used in the transport of heavy loads yet it can be used in connection with vehicles constructed for lighter work and wherever found desirable. In the attempt to overcome the same the expedient has been tried of using light motor vehicles with heavier trailers, which latter did not require rubber or like tires and were adapted for the transportation of heavy loads. From this practice, however, the disadvantage arises that such vehicles can not be driven backward without specially steering the trailer; furthermore, they can not make abrupt turns and, because of length, are unsuited for use on town and city streets.

The present invention consists in a motor vehicle comprising a body frame proper suitably mounted upon wheels; a load surface surmounting said body frame and supported upon a separate and distinct axle, the wheels connected with which separate axle are placed in the same transverse line as the wheels supporting the body frame; and a device arranged between the said load surface and the body frame whereby the weight imposed upon the load surface may be distributed by the operator of the vehicle between said load surface and the body frame. By this construction the load dray forms, with the motor carrier, a single articulated member, in which all parts follow the movement of the front wheels in any direction as a comparatively rigid whole, and thus overcomes the objections to former structures hereinbefore pointed out.

In the accompanying drawings forming part of this specification, like letters of reference denote like parts wherever they occur, and Figure 1 shows a side elevation; Fig. 2 is a plan view; and Fig. 3 is a rear view.

In the preferred embodiment of this invention, as illustrated in the drawings, the front axle $a$ and the back axle $b$ are resiliently secured in any well known manner to the vehicle body frame $c$. The wheels $r$ of these front and back axles ($a$ and $b$) are fitted with elastic tires. In the same transverse line (Fig. 1) as the axle $b$, is situated the separate axle $d$ for the stronger wheels $e$, which carry the main portion of the load. As possibly an axle laid from one wheel $e$ to the other wheel $e$ would collide with the vehicle frame proper $c$ and its rear wheels $r$, an axle frame $g$ connects the wheels $e$. Said frame $g$ carries on strong springs $h$ the load surface $f$, the front end of which rests on an elastic support $i$. The latter is adjustable between said load surface $f$ and the vehicle frame $c$ in slideguides $k$ and may, for example, be operated from the support $n$ with the aid of the screw-threaded spindle $l$ with the removable hand-wheel $m$. At the rear of the vehicle, the frame $c$ is suitably connected with the load surface $f$—for example, by means of a diagonal pair of wire ropes forming a cross $o$ with tension-screws $p$ and springs $q$ connecting up in them.

The wheels $e$ sustain the greater portion of the weight which may be imposed upon the load-surface $f$, and these wheels are provided with ordinary steel tires, while a considerably smaller portion of the weight falls upon the elastic support $i$ and consequently on the frame $c$ and wheels $r$. In order, also, to be able suitably to distribute on the front and back rubber wheels $r$, within certain limits, the portion of the load which is to be borne by the frame $c$, the support $i$ is arranged in guides $k$ on the under surface of the load-platform $f$ and the upper face of the body frame $c$.

The load surface $f$ permanently retains its position with regard to the frame $c$, and consequently, like the latter, follows exactly and simultaneously the turnings of the front wheels, so that this new motor vehicle is able to travel backward and to turn as if it possessed four wheels instead of six.

A modification of my device can be arranged with success on other than four wheeled vehicles.

I claim—

1. In a vehicle, a body frame proper suitably mounted upon wheels, and a separate interrupted axle supporting a load surface, the parts of said interrupted axle being connected by an axle frame and said vehicle having an elastic support arranged between the load-surface and the body frame and working in guideways whereby the weight upon the load surface may be distributed in varying proportions, as desired, between the said interrupted axle and the body frame.

2. In a vehicle, a load surface supported upon a separate axle, a main frame, and a slidable interposed elastic member for the purpose of distributing the weight imposed upon said load surface between the separate axle and the main frame.

3. In a vehicle, a load surface supported upon a separate axle, a main frame, and a slidable interposed elastic member consisting of a coiled spring working in guideways and controlled as to position therein, by a screw-threaded spindle having a hand-wheel and working through an upright support.

In testimony whereof I affix my signature in presence of two witnesses.

FRIEDRICH LÜTHKE.

Witnesses:
 HANS WOLFF,
 OTTO HOFMANN.